United States Patent
Sugiura

(10) Patent No.: US 10,375,386 B2
(45) Date of Patent: Aug. 6, 2019

(54) CALIBRATION DEVICE, CALIBRATION METHOD, AND PROGRAM FOR PROJECTION DISPLAY DEVICE, PROJECTION DISPLAY DEVICE, AND PROJECTION DISPLAY SYSTEM

(71) Applicant: Panasonic Intellectual Property Management Co., Ltd., Osaka (JP)

(72) Inventor: Yoshinao Sugiura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/000,365

(22) Filed: Jun. 5, 2018

(65) Prior Publication Data

US 2018/0359466 A1    Dec. 13, 2018

(30) Foreign Application Priority Data

Jun. 7, 2017   (JP) .................................. 2017-112884

(51) Int. Cl.
*H04N 17/00*    (2006.01)
*H04N 9/31*    (2006.01)
*H04N 17/04*    (2006.01)

(52) U.S. Cl.
CPC .......... *H04N 17/04* (2013.01); *H04N 9/3194* (2013.01)

(58) Field of Classification Search
CPC ...... H04N 17/04; H04N 17/045; H04N 17/02; H04N 17/00; H04N 17/004; H04N 9/3194; H04N 9/3191; H04N 9/31; H04N 9/28

USPC ........ 348/178, 180–182, 189, 190, 744–747, 348/806, 807
See application file for complete search history.

(56) References Cited

U.S. PATENT DOCUMENTS

| 7,995,098 B2* | 8/2011 | Pedeville ............... H04N 17/04 348/177 |
| 2009/0002510 A1 | 1/2009 | Uchihashi et al. |
| 2018/0160086 A1* | 6/2018 | Naganuma ............... H04N 9/31 |

FOREIGN PATENT DOCUMENTS

| JP | 8-201913 | 8/1996 |
| JP | 2005-136699 | 5/2005 |
| JP | 2006/304100 | 11/2006 |
| JP | 2009-10782 | 1/2009 |
| JP | 5605473 | 10/2014 |

\* cited by examiner

*Primary Examiner* — Sherrie Hsia
(74) *Attorney, Agent, or Firm* — Wenderoth, Lind & Ponack, L.L.P.

(57) ABSTRACT

After calibration of the projector, the control circuit obtains a first position-data indicating the position of a feature point in the screen and a second position-data indicating the position of a feature point in a test image projected onto the screen. After acquisition of the first position-data and the second position-data, the control circuit obtains a third position-data indicating the position of a feature point in the screen and a fourth position-data indicating the position of a feature point in the test image projected onto the screen. Based on a difference between the first position-data and the third position-data, the control circuit corrects the position of a feature point in the test image contained in the fourth position-data to create a fifth position-data. Based on a difference between the second position-data and the fifth position-data, the control circuit recalibrates the projector.

11 Claims, 19 Drawing Sheets

| MARKER ID | COORDINATE MP (x, y) |
|---|---|
| 1 | (97,128) |
| 2 | (1093,166) |
| 3 | (95,590) |
| 4 | (1112,676) |

| FEATURE-POINT ID | COORDINATE FP (x, y) |
|---|---|
| 1 | (116,153) |
| 2 | (166,155) |
| 3 | (216,157) |
| 4 | (268,159) |
| ⋮ | ⋮ |
| n | (211,488) |
| ⋮ | ⋮ |

| FEATURE-POINT ID | COORDINATE FP' (x, y) |
|---|---|
| 1 | (129,132) |
| 2 | (180,134) |
| 3 | (229,136) |
| 4 | (281,138) |
| ⋮ | ⋮ |
| n | (226,466) |
| ⋮ | ⋮ |

CALIBRATION DEVICE, CALIBRATION METHOD, AND PROGRAM FOR PROJECTION DISPLAY DEVICE, PROJECTION DISPLAY DEVICE, AND PROJECTION DISPLAY SYSTEM

BACKGROUND

1. Technical Field

The present disclosure relates to a calibration device, a calibration method, and a program used for calibrating of at least one projection display device that projects an image on a projection plane. The present disclosure also relates to a projection display device having such a calibration device. The present disclosure also relates to a projection display system having such a calibration device and a projection display device.

2. Description of Related Art

A projection display device that projects an image on a projection plane, in its initial set-up, undergoes calibration so that image projection is fitted within a projection range of the projection plane. However, a deviation of the relative position between the projection plane and the projection display device can occur when a time has passed after the calibration. Therefore, the projection display device has to be regularly recalibrated. To detect the positional deviation, i.e., to measure the relative position or a positional change between the projection plane and the projection display device, a sensor, for example, an imaging device and a distance measuring sensor may be used.

According to a multi-projection system—in which an image is formed by images projected by a plurality of projectors—disclosed by Japanese Unexamined Patent Application Publication No. 2006-304100, a geometrical deviation between the images projected by the projectors is detected and then recalibrated. Specifically, in measurement by a distance measuring sensor, if the currently measured relative position does not agree with the previously measured relative position, the system determines that the image formed on the screen has a geometrical deviation. If the geometrical deviation is detected, the system performs recalibration and forms a corrected image on the screen using a calculated correction value.

According to the disclosure of Japanese Unexamined Patent Application Publication No. 2006-304100, however, deviation that can be caused by the distance measuring sensor itself is not taken into consideration. That is, the detected relative position itself can contain an error.

To address the problem above, the present disclosure provides a calibration device for a projection display device capable of recalibrating a deviation of the relative position between the projection plane and the projection display device detected after calibration of the projection display device, while taking a deviation of the sensor itself into consideration. The present disclosure provides a calibration method and a program of the aforementioned calibration devise. It also provides a projection display device having the aforementioned calibration device. It also provides a projection display system having the aforementioned calibration device and the projection display device.

SUMMARY

The calibration device as an aspect of the present disclosure has a controller for calibrating at least one projection display device that projects an image on a projection plane. The controller causes an imaging device to capture an image of a projection plane and obtains from the captured image a first position-data that indicates the set of positions of plural feature points in the projection plane. Next, the controller causes the at least one projection display device to project a test image onto the projection plane, then causes the imaging device to capture an image of the test image, and obtains from the captured image a second position-data that indicating the set of positions of plural feature points in the test image.

After that, the controller causes the imaging device to capture an image of the projection plane and obtains from the captured image a third position-data that indicates the set of positions of the feature points in the projection plane. Next, the controller causes the at least one projection display device to project the test image onto the projection plane, then causes the imaging device to capture an image of the test image and obtains from the captured image a fourth position-data that indicates the set of positions of the feature points in the test image.

Based on a difference between the first position-data and the third position-data, the controller obtains a first deviation-data that indicates a deviation in a relative position between the imaging device and the projection plane, and further, based on the first deviation-data, the controller corrects the set of positions of the feature points in the test image contained in the fourth position-data to create a fifth position-data.

Based on the difference between the second position-data and the fifth position-data, the controller obtains a second deviation-data that indicates a deviation in a relative position between the at least one projection display device and the projection plane, and further, based on the second deviation-data, the controller calibrates the at least one projection display device.

The calibration device of an aspect of the present disclosure recalibrates the projection display device on a deviation of the relative position between the projection plane and the projection display device detected after calibration of the projection display device, while taking a deviation of the sensor itself into consideration.

BRIEF DESCRIPTION OF DRAWINGS

FIG. 5 shows each coordinate of the markers in the image of FIG. 4, showing the format of the data to be stored in a memory device of FIG. 1;

FIG. 8 shows each coordinate of the feature points of the test image of FIG. 7, showing the format of data to be stored in the memory device of FIG. 1;

FIG. 14 shows each coordinate of the feature points of the test image of FIG. 13, showing the format of the data to be stored in the memory device of FIG. 1;

DETAILED DESCRIPTION

Hereinafter, an exemplary embodiment will be described in detail, with reference to the accompanying drawings. Throughout the description, details beyond necessity (for example, descriptions on well-known matters or on substantially identical structures) may be omitted to eliminate redundancy from the description below for easy understanding of those skilled in the art.

It is to be understood that the accompanying drawings and the description below are for purposes of full understanding of those skilled in the art and are not to be construed as limitation on the scope of the claimed disclosure.

First Exemplary Embodiment

Hereinafter, the structure of the first exemplary embodiment is described with reference to FIG. 1 through FIG. 17.

[1-1. Structure]

Figure 1:
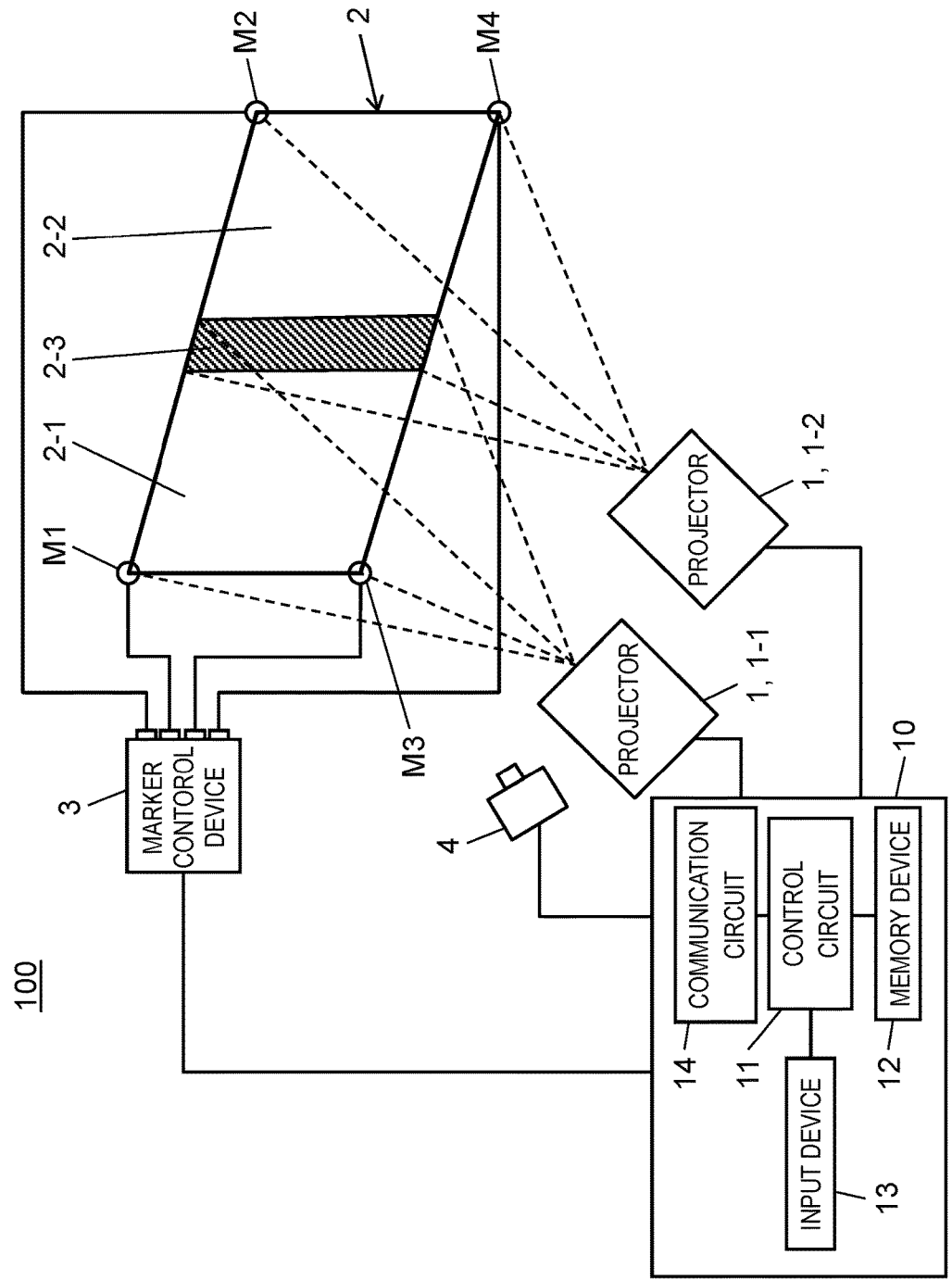
FIG. 1 is a schematic view showing the projection display system in accordance with a first exemplary embodiment.

FIG. 1 is a schematic view showing projection display system 100 in accordance with the first exemplary embodiment. Projection display system 100 has projector 1, screen 2, markers M1 through M4, marker control device 3, imaging device 4, and calibration device 10.

Projector 1 is a projection display device that projects image (or video) so as to be fitted within the projection range of screen 2 (as a projection plane) under control of calibration device 10. In the structure of the exemplary embodiment, projector 1 has two projectors (projector 1-1 and projector 1-2). Projectors 1-1 and 1-2 have projection ranges 2-1 and 2-2, respectively. Projection ranges 2-1 and 2-2 have overlapped region 2-3 with each other. As a method for projecting an image on screen 2 by using a plurality of projectors, edge blending is commonly used. In edge blending, an image is projected on the screen such that an adjacent part of projection ranges 2-1 and 2-2 is overlapped with each other. In overlapped region 2-3, the brightness of projector 1-1 and projector 1-2 is gradually crossfaded so as to make the joint portion of the image less noticeable.

Markers M1 through M4 are disposed at predetermined four-or-more positions that meet with screen 2. In the example of FIG. 1, rectangular screen 2 is disposed on a wall surface of a building and markers M1 through M4 are embedded in the wall surface at positions that meet with the four corners of screen 2. Markers M1 through M4 light on/off under control of marker control device 3. For example, markers M1 through M4 have LED elements and they emit light by power feeding from a cable connected to marker control device 3. Marker control device 3 makes markers M1 through M4 light on/off under control of calibration device 10.

Imaging device 4 is disposed at a proper position so as to image a predetermined region including screen 2 and markers M1 through M4 under control of calibration device 10. Imaging device 4 sends the taken image to calibration device 10.

Calibration device 10 calibrates projectors 1-1 and 1-2 so that the images projected by them fit with the projection range of screen 2. Further, calibration device 10 detects a deviation of the relative position between screen 2 and projectors 1-1, 1-2 after calibration of the projection display device and then recalibrates projectors 1-1, 1-2. Calibration device 10 has control circuit 11, memory device 12, input device 13, and communication circuit 14. Control circuit 11 is the controller that governs the entire workings of calibration device 10 and projection display system 100. Memory device 12 stores a test image used for calibrating projectors 1-1 and 1-2. Besides, it stores a set of positions of plural feature points in the image imaged by imaging device 4. Input device 13 has, for example, a switch that receives user input for controlling calibration device 10. Communication circuit 14 is the communicator that has an interface to be connected to each of projectors 1-1 and 1-2, marker control device 3, and imaging device 4.

Calibration device 10 may be a device dedicated for calibrating projectors 1-1 and 1-2, or may be a general-purpose device, such as a personal computer, which performs a program for calibrating projectors 1-1 and 1-2.

Projectors 1-1 and 1-2, marker control device 3, and imaging device 4 may be connected to calibration device 10 via a same kind of interface or via a different kind of interface. For example, projectors 1-1 and 1-2 may be connected to calibration device 10 via a LAN cable; marker control device 3 may be connected to calibration device 10 via an RS-232 communication cable; and imaging device 4 may be connected to calibration device 10 via a USB communication cable.

Markers M1 through M4 are not necessarily disposed at the corners of screen 2. Markers M1 through M4 may be disposed at any given positions as long as the followings are satisfied: markers M1 through M4 are fixed adjacent to screen 2; imaging device 4 can capture an image of screen 2 and markers M1 through M4 simultaneously; and the deviation of the relative position and the angle between screen 2 and imaging device 4 can be detected.

A projection plane of an object on which an image is projected is not necessarily screen 2; projectors 1-1 and 1-2 may project an image on, for example, a wall surface of a building.

Projection display system 100 may have a single projector (i.e., projection display device) or may have three or more projectors.

Calibration device 10 may read out an image or video that is to be projected on screen 2 by projectors 1-1, 1-2 from memory device 12, or may read out it from other source device via communication circuit 14. Memory device 12 may have a removable memory medium and a read-out device for the memory medium.

[1-2. Workings]

The workings of projection display system 100 having aforementioned structure will be described below.

Control circuit 11 of calibration device 10 performs initial calibration and recalibration.

[1-2-1. Initial Calibration]

Figure 2:
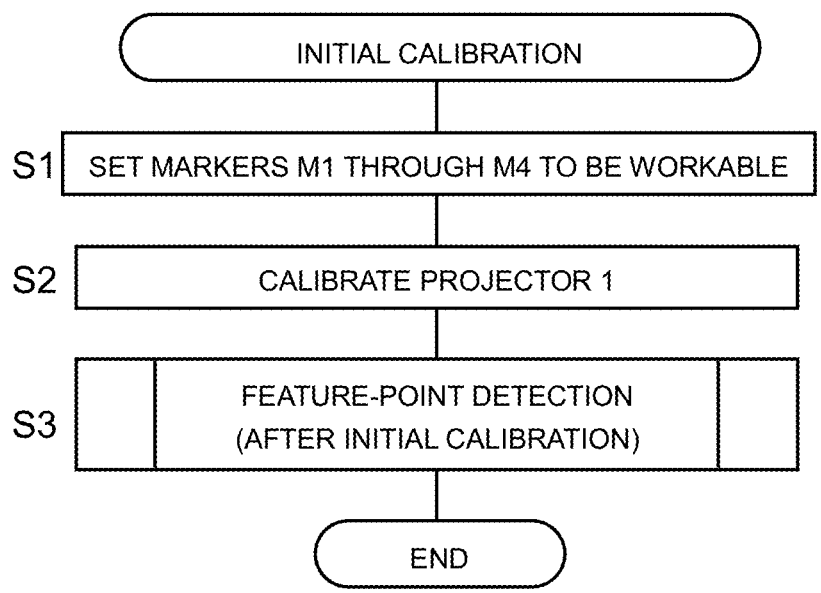
FIG. 2 is a flowchart showing the initial calibration process performed by the controller of FIG. 1.

FIG. 2 is a flowchart showing the initial calibration process performed by control circuit 11 of FIG. 1.

In step S1, control circuit 11 sets markers M1 through M4 to be workable. Specifically, after markers M1 through M4 have been disposed at predetermined positions that fit with screen 2, control circuit 11 checks whether markers M1 through M4 are controllable via marker control device 3 or not.

In step S2, control circuit 11 calibrates projectors 1-1 and 1-2 so that image projection of them fits with the projection range of screen 2 (initial calibration). Specifically, control circuit 11 adjusts the installation angle, lens shifting, zooming, and focal-point distance of projectors 1-1 and 1-2 so that projection range 2-1 of projector 1-1 and projection range 2-2 of projector 1-2 include a predetermined range assigned for each projector in the projection range of screen 2. Further, control circuit 11 performs geometrical correction so that projection range 2-1 of projector 1-1 and projection range 2-2 of projector 1-2 coincide with the projection range of screen 2. Control circuit 11 performs edge blending on overlapped region 2-3 of projection range 2-1 of projector 1-1 and projection range 2-2 of projector 1-2. Using imaging device 4, control circuit 11 automatically performs a series of processes above.

In step S3, control circuit 11 performs a feature-point detecting process to have state measurement of projection display system 100 immediately after calibration of projectors 1-1 and 1-2 in step S2 (feature-point detection immediately after initial calibration).

Steps S1 through S2 may be manually performed by a user, not by control circuit 11 of calibration device 10.

Figure 3:
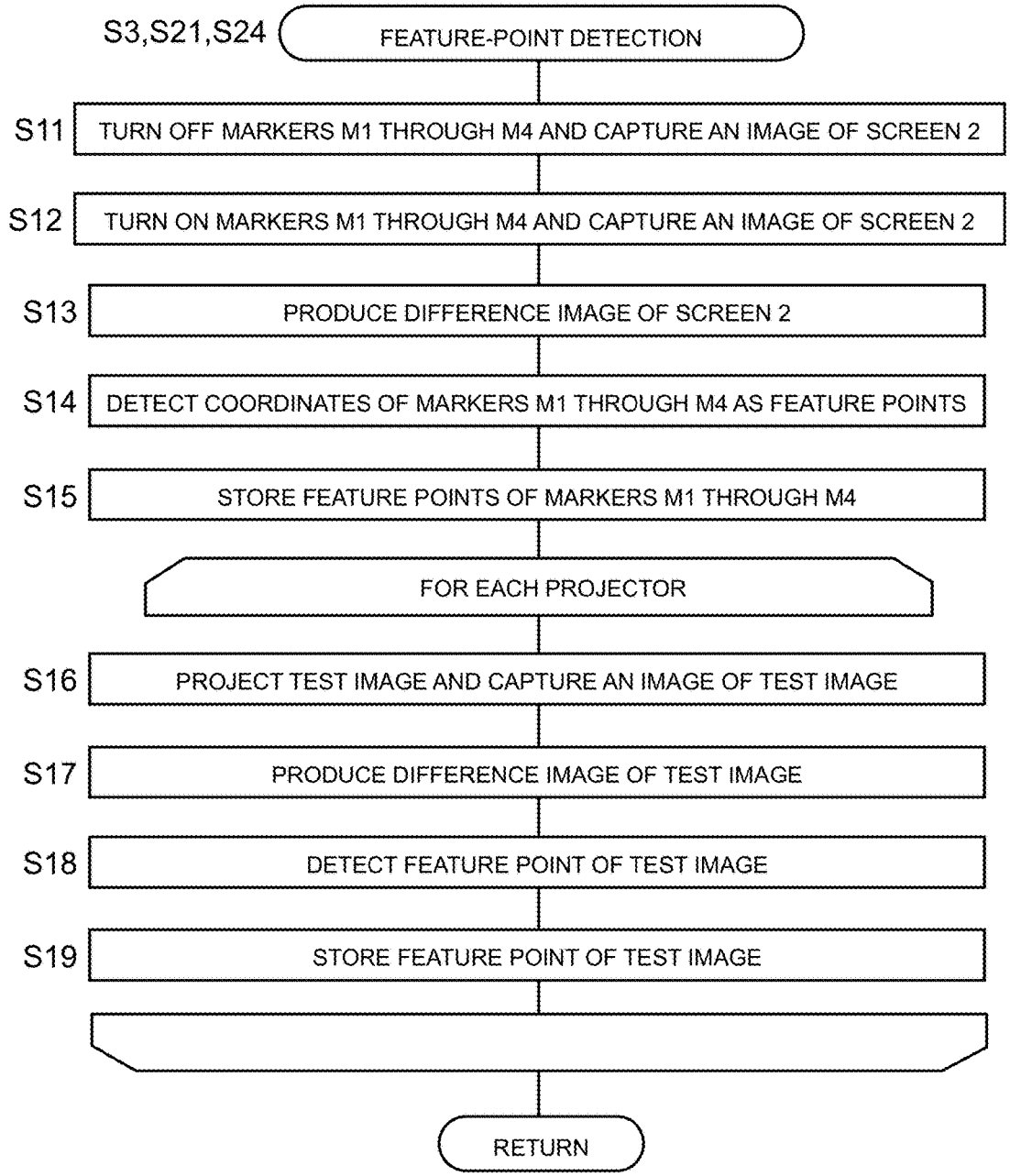
FIG. 3 is a flowchart of the subroutine for the feature-point detecting process performed at step S3 of FIG. 2 (and at steps S21, S24 of FIG. 9)
Figure 9:
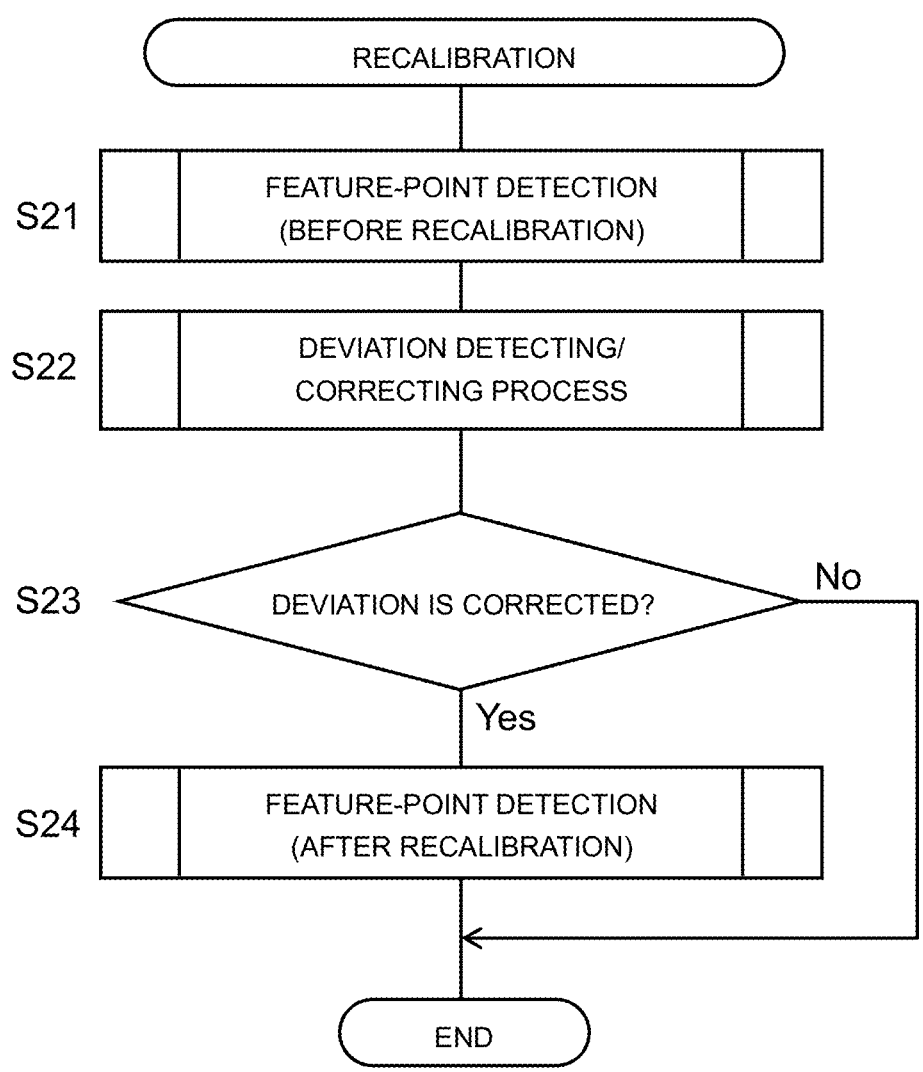
FIG. 9 is a flowchart showing the recalibration process performed by the controller of FIG. 1.

FIG. 3 is a flowchart of the subroutine for the feature-point detecting process performed at step S3 of FIG. 2 (and at steps S21, S24 of FIG. 9).

Performing steps S11 through S15 of FIG. 3 allows control circuit 11 to have information that indicates a relative position and an angle of screen 2 and imaging device 4.

In step S11, control circuit 11 turns off markers M1 through M4 and causes imaging device 4 to capture an image of the projection range of screen 2. Specifically, control circuit 11 issues a light-off command to marker control device 3 so as to turn off markers M1 through M4; and at the same time, control circuit 11 issues the light-off command to projectors 1-1 and 1-2 so as to have no image projection from projectors 1-1 and 1-2. Next, control circuit 11 issues an image pick-up command to imaging device 4 so as to capture an image of screen 2 and markers M1 through M4. The taken image is sent from imaging device 4 to calibration device 10 and is stored in memory device 12.

In step S12, control circuit 11 turns on markers M1 through M4 to image the projection range of screen 2. Specifically, control circuit 11 issues a light-on command to marker control device 3 so as to turn on markers M1 through M4. Projectors 1-1 and 1-2 maintain a state of no image projection. Next, control circuit 11 issues the image pick-up command to imaging device 4 so as to capture an image of screen 2 and markers M1 through M4. The taken image is sent from imaging device 4 to calibration device 10 and is stored in memory device 12. At the end of step S12, control circuit 11 issues the light-off command to marker control device 3 again so as to turn off markers M1 through M4.

In step S13, based on the images imaged in step S11 and step S12, control circuit 11 creates a difference image of screen 2. The created image has a high signal value at the positions of markers M1 through M4 and has a low signal value at positions other than the markers.

In step S14, control circuit 11 detects the coordinates of markers M1 through M4 from the image created in step S13 and obtains the coordinates of the markers as a first position-data showing the set of positions of plural feature points of screen 2.

Figure 4:
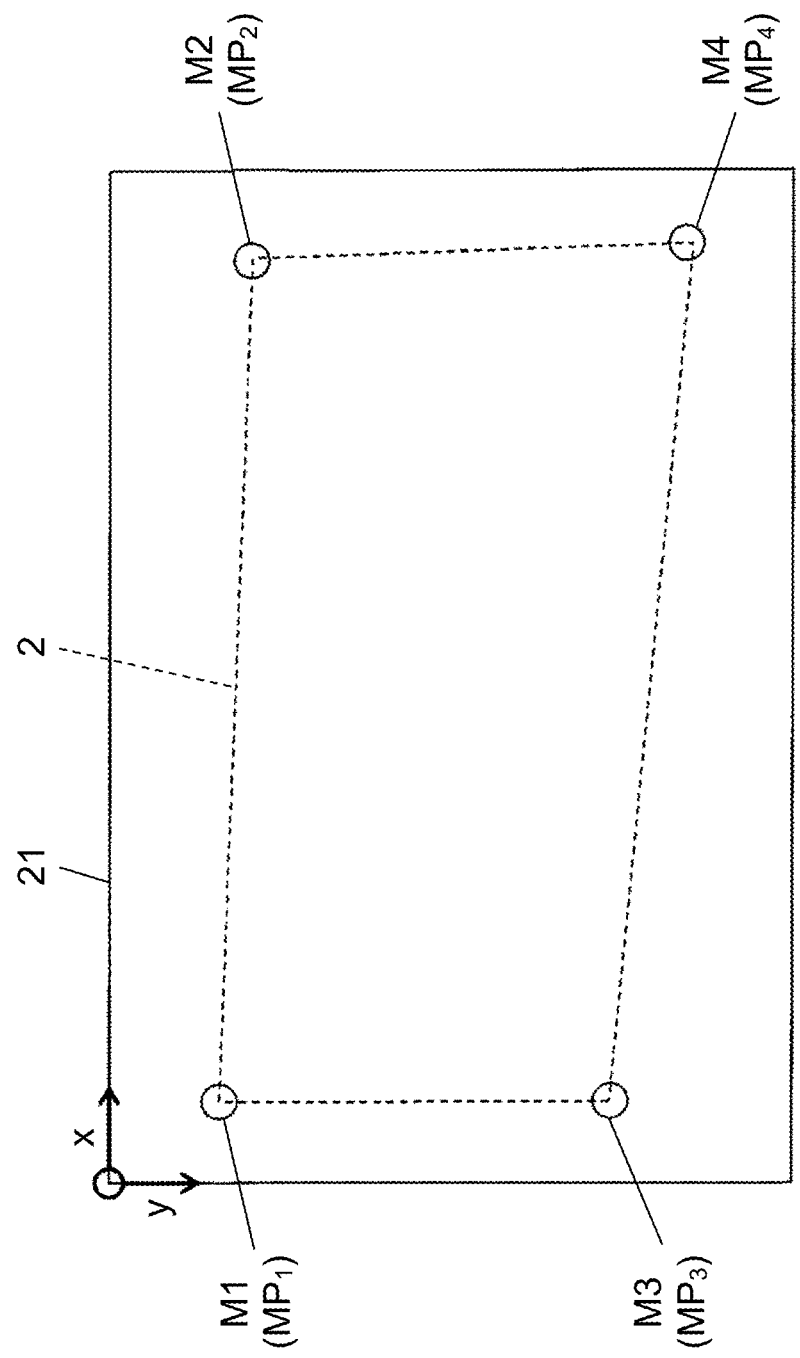
FIG. 4 shows an image containing markers, which is imaged by the imaging device when step S3 of FIG. 2 is performed.

FIG. 4 shows image 21 including markers M1 through M4, which is imaged by imaging device 4 when step S3 of FIG. 2 is performed. The image of FIG. 4 is created in step S13 and is used for detecting the coordinates of markers M1 through M4. FIG. 4 shows an example where image 21 has 1200×800 pixels in resolution, and a position in image 21 is represented by the coordinate system having its origin at the upper left corner of image 21. Coordinates $MP_1$ through $MP_4$ in image 21, which correspond to the positions of four markers M1 through M4, respectively, retain high signal values. The quadrilateral shown by broken lines in FIG. 4 is not actually contained in image 21; it indicates, for convenience sake, the range corresponding to screen 2, showing the position of the range in captured image 21. Control circuit 11 detects coordinates with a high signal value in the entire region of image 21, and the positions of the detected coordinates are determined to coordinates $MP_1$ through $MP_4$ corresponding to markers M1 through M4, respectively.

In step S15 of FIG. 3, control circuit 11 stores the feature point of markers M1 through M4, i.e., coordinates $MP_1$ through $MP_4$ detected in step S14, in memory device 12.

FIG. 5 shows coordinates $MP_1$ through $MP_4$ of markers M1 through M4, respectively, in image 21 of FIG. 4, showing the format of data 31 to be stored in memory device 12 of FIG. 1. Numerical values 1 through 4 in the marker ID field indicate the ID number corresponding to markers M1 through M4, respectively. The coordinate values of markers M1 through M4 are stored in the coordinate field.

Next, steps S16 through S19 of FIG. 3 are performed for each of projector 1-1 and projector 1-2. Through the processes, control circuit 11 obtains information that indicates a relative position and an angle of each of projectors 1-1, 1-2 and screen 2.

First, the workings for obtaining the information indicating the relative position and the angle of projector 1-1 and screen 2 will be described below.

In step S16 of FIG. 3, control circuit 11 causes projector 1-1 to project a test image on screen 2, and causes imaging device 4 to capture an image of screen 2 and the projected test image. Specifically, control circuit 11 sends the test image stored in memory device 12 and a projection command to projector 1-1. Receiving the image and the command, projector 1-1 projects the test image on screen 2. At the same time, control circuit 11 issues a light-off command to a projector other than projector 1-1, i.e., projector 1-2 so as project no image. Next, control circuit 11 issues an image pick-up command to imaging device 4, and imaging device 4 images screen 2 and the projected test image. The taken test image is sent from imaging device 4 to calibration device 10 and is stored in memory device 12.

In step S17, based on the images taken in step S11 and step S16, control circuit 11 creates a difference image of the test image. In step S11, as described earlier, imaging device 4 images the screen on which no image is projected from projectors 1-1, 1-2. Therefore, in the image created in step S17, only the region in which a test image is contained has a signal value corresponding to the test image, but the region with no test image has a low signal value.

Figure 6:
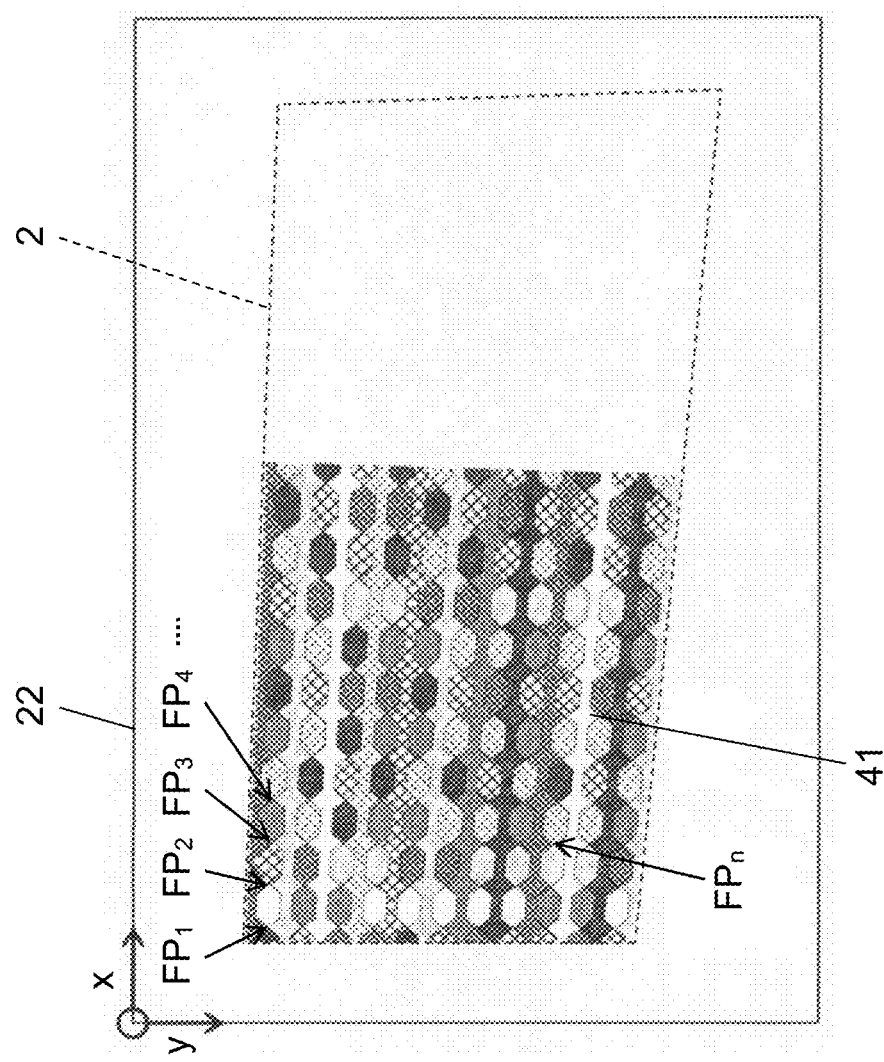
FIG. 6 shows an image containing a test image projected on the screen by the projector, which is imaged by the imaging device when step S16 of FIG. 3 is performed.

FIG. 6 shows image 22 containing test image 41 projected on screen 2 by projector 1-1, which is imaged by imaging device 4 when step S16 of FIG. 3 is performed. Test image 41 is projected by projector 1-1 so as to be fitted within the projection range of screen 2. Test image 41 has a plurality of hexagonal patterns disposed side-by-side, and adjacent patterns are differently colored. In test image 41, a position at which hexagonal patterns of different color in the longitudinal and lateral directions cross with each other is detected as a feature point. In the description below, for the sake of convenience, IDs (1, 2, 3, . . . ) are given, in the order of from upper left, to the feature points in image 22, and accordingly, the feature points are represented by the coordinates ($FP_1$, $FP_2$, $FP_3$, . . . ). Further, image 22 has N (in number) feature points in total, and the coordinates of N feature points are referred to collectively as FP(N). That is, FP(N)=FP1, FP2, FP3, . . . , $FP_n$, . . . , $FP_N$.

In step S18 of FIG. 3, control circuit 11 detects the feature points in test image 41 and corresponding coordinate FP(N) from the image created in step S17. Coordinate FP(N) detected above are obtained as a second position-data that indicates a set of positions of plural feature points in test image 41.

The specifications of test image 41 shown in FIG. 6 and the method of detecting coordinate FP(N) of feature points are disclosed, for example, in Japanese Patent No. 5605473. It discloses a projection video display device having a light modulation device that modulates light fed from a light source and a projection unit that projects the light fed from the light modulation device on a projection plane. The projection video display device of Japanese Patent No. 5605473 has a device controller, an acquisition section, and an adjustment section. The device controller causes the light modulation device to show a test pattern image for determining a feature point by a plurality of adjacent regions. The test pattern image projected on the projection plane is imaged by an image pick-up device. The acquisition section obtains the image of the test pattern image from the image pick-up device. Based on the image obtained by the acquisition section, the adjustment section finds feature points in the image, and further, based on the detected feature points, the adjustment section provides an image to be projected on the projection plane with adjustment. The adjacent regions are formed of first adjacent regions and second adjacent regions. The first adjacent regions, each of which has a hexagonal shape, are disposed in one direction so as to be adjacent to each other at a feature point, forming a first adjacent-region joint section. The first adjacent-region joint section is sandwiched between the second adjacent regions in a direction perpendicular to the predetermined direction described above, i.e., the second adjacent regions are disposed to be adjacent to a plurality of feature points of the first adjacent-region joint section. Each of the feature points is surrounded by four adjacent regions formed of two first-adjacent regions disposed adjacent to each other and two second-adjacent regions disposed adjacent to each other. The four adjacent regions at each feature point have different color information, and each of the adjacent regions has any one of color information selected from red, green, blue, cyan, yellow, magenta, white, and black.

The specifications of test image 41 and the method for detecting coordinate FP(N) of feature points are not limited to the structure disclosed in Japanese Patent No. 5605473; other specifications and methods can be employed.

Figure 7:
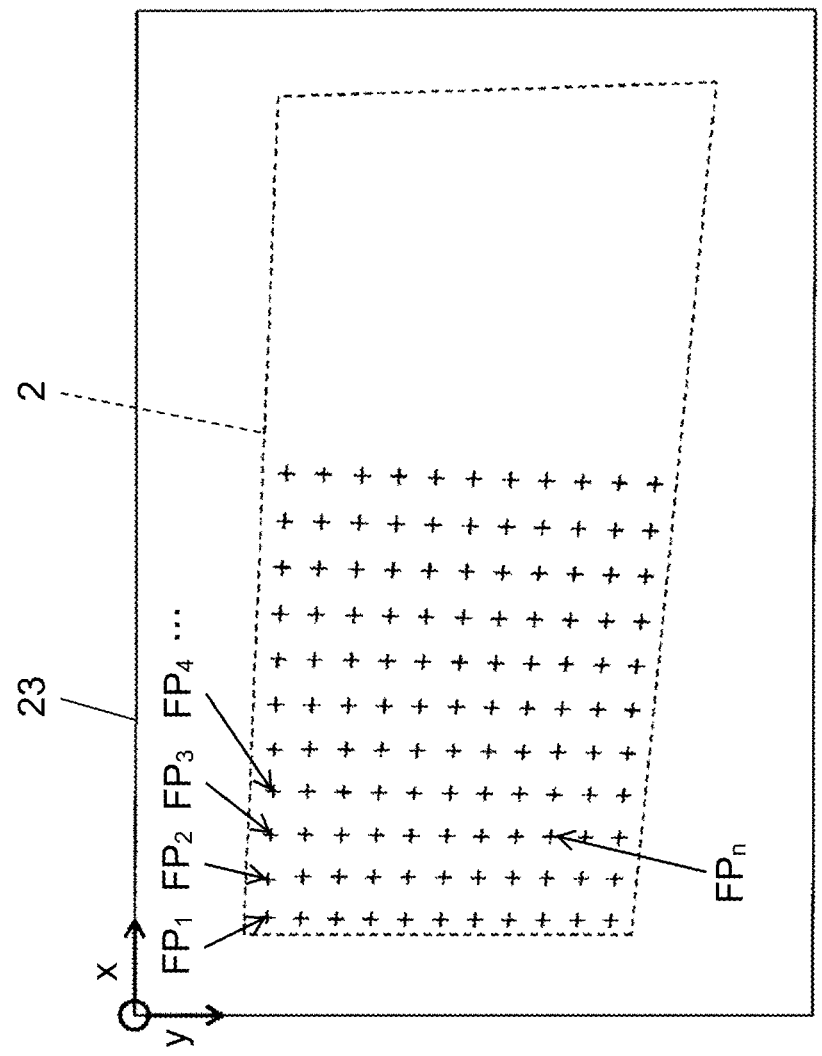
FIG. 7 is virtual image showing coordinates FP(N) of the feature points detected from the test image of FIG. 6.

FIG. 7 is virtual image 23 showing coordinates FP(N) of the feature points detected from test image 41 of FIG. 6. Image 23 of FIG. 7 is so formed that the feature points of test image 41 detected in step S18 are plotted onto a region having the same number of pixels with image 22 of FIG. 6.

In step S19 of FIG. 3, control circuit 11 stores coordinate FP(N) of the feature points of test image 41 detected in step S18 into memory device 12.

FIG. 8 shows each coordinate of the feature points of test image 41 of FIG. 7, showing the format of data 32 to be stored in memory device 12 of FIG. 1. Numerical values in the feature-point ID field indicate the ID number corresponding to each feature point. The coordinate values of the feature points are stored in the coordinate field.

Next, projector 1-2 also undergoes steps S16 through S19 of FIG. 3, like the case the same as projector 1-1. Through the procedures, control circuit 11 obtains information that indicates a relative position and an angle of each of projector 1-2 and screen 2. When the projection display system has three or more projectors, steps S16 through S19 is repeatedly performed for each projector.

According to the initial calibration process, as described above, after calibrating projectors 1-1 and 1-2, control circuit 11 performs steps S11 through S15. Through the procedures, from the image of screen 2 imaged by imaging device 4, control circuit 11 obtains the first position-data. The first position-data indicates the positions of the feature points in screen 2, i.e., indicates the relative position and the angle of screen 2 and imaging device 4 immediately after calibration of projectors 1-1 and 1-2. Successively, in steps S16 through S19, control circuit 11 causes control of projectors 1-1, 1-2 to project test image 41 onto screen 2, and causes imaging device 4 to capture an image of test image 41, so that control circuit 11 obtains the second position-data. The second position-data indicates the positions of the feature points in test image 41, i.e., indicates the relative position and the angle of screen 2 and projectors 1-1, 1-2 immediately after calibration of projectors 1-1, 1-2. Further, control circuit 11 stores the first position-data and the second position-data into memory device 12.

[1-2-2. Recalibration]

FIG. 9 is a flowchart showing the recalibration process performed by control circuit 11 of FIG. 1.

The recalibration process of FIG. 9 is performed after an interval from the execution of the initial calibration process of FIG. 2, i.e., after an interval from the acquisition of the first position-data and the second position-data.

In step S21, control circuit 11 performs the feature-point detecting process (feature-point detection just before recalibration). The process is for measuring the current state—the state just before recalibration of projectors 1-1, 1-2—of projection display system 100. The feature-point detecting process of step S21 is the same as that of step S3 of FIG. 2 (that has been described with reference to FIG. 3). After control circuit 11 has obtained the first position-data and the second position-data, step S11 through step S15 of FIG. 3 are performed. Through the steps, control circuit 11 causes imaging device 4 to capture an image of screen 2, and control circuit 11 obtains a third position-data. The third position-data indicates the positions of the feature points in screen 2, i.e., indicates the relative position and the angle of screen 2 and imaging device 4 just before recalibration of projectors 1-1 and 1-2. Successively, step S16 through step S19 of FIG. 3 are performed. Through the steps, control circuit 11 causes projectors 1-1, 1-2 to project test image 41 onto screen 2, and causes imaging device 4 to capture an image of test image 41, and control circuit 11 obtains a four position-data. The four position-data indicates the positions of the feature points in test image 41, i.e., indicates the relative position and the angle of screen 2 and projector 1-1, 1-2 imaging device 4 just before recalibration of projectors 1-1 and 1-2. Further, control circuit 11 stores the third position-data and the fourth position-data into memory device 12.

Figure 10:
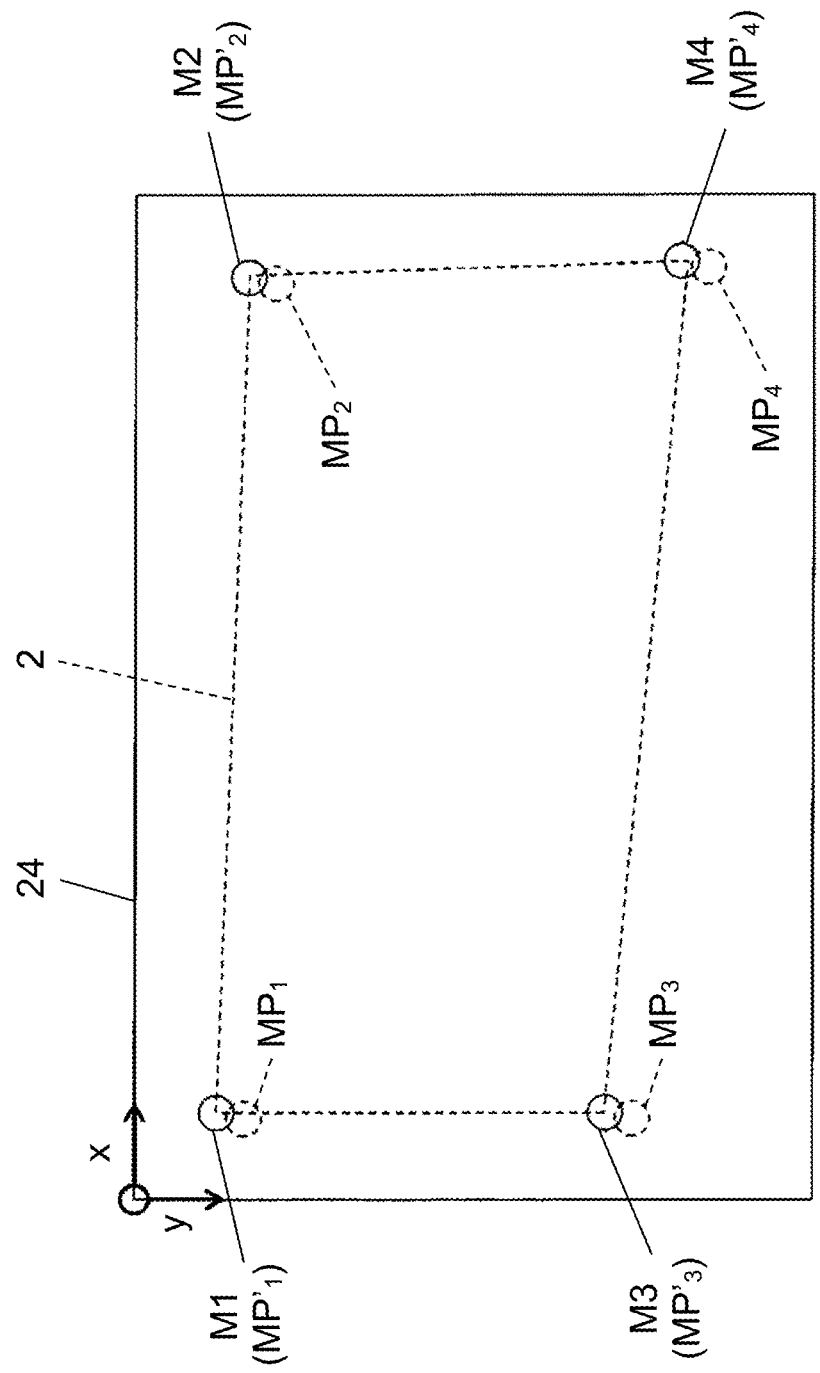
FIG. 10 shows an image containing markers, which is imaged by the imaging device when step S21 of FIG. 9 is performed.
Figure 11:
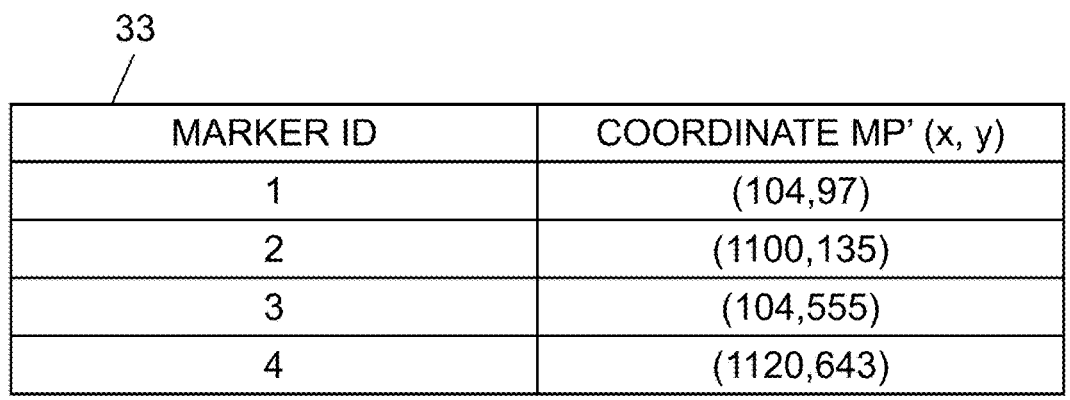
FIG. 11 shows each coordinate of the markers in the image of FIG. 10, showing the format of the data to be stored in a memory device of FIG. 1.

FIG. 10 shows image 24 containing markers M1 through M4, which is imaged by imaging device 4 when step S21 of FIG. 9 is performed. FIG. 11 shows the coordinates of markers M1 through M4 in image 24 of FIG. 10, showing the format of data 33 to be stored in memory device 12 of FIG. 1. Coordinates $MP'_1$ through $MP_4$ of markers M1 through M4, respectively, of FIG. 10 are obtained in the feature-point detecting process of step S21, i.e., obtained by execution of step S11 through step S14 of FIG. 3. FIG. 10 shows coordinates $MP_1$ through $MP_4$ of markers M1 through M4 (see FIG. 4), too, which have been obtained by the feature-point detecting process (immediately after initial calibration) performed in step S3 of FIG. 2. FIG. 10 and FIG. 11 show that the relative position or the angle of screen 2 and imaging device 4 has a little bit change after initial calibration, as is shown by a deviation occurred between coordinates $MP'_1$ through $MP'_4$ of the current positions of markers M1 through M4 and coordinates $MP_1$ through $MP_4$ of the positions of markers M1 through M4 obtained immediately after initial calibration.

Figure 12:
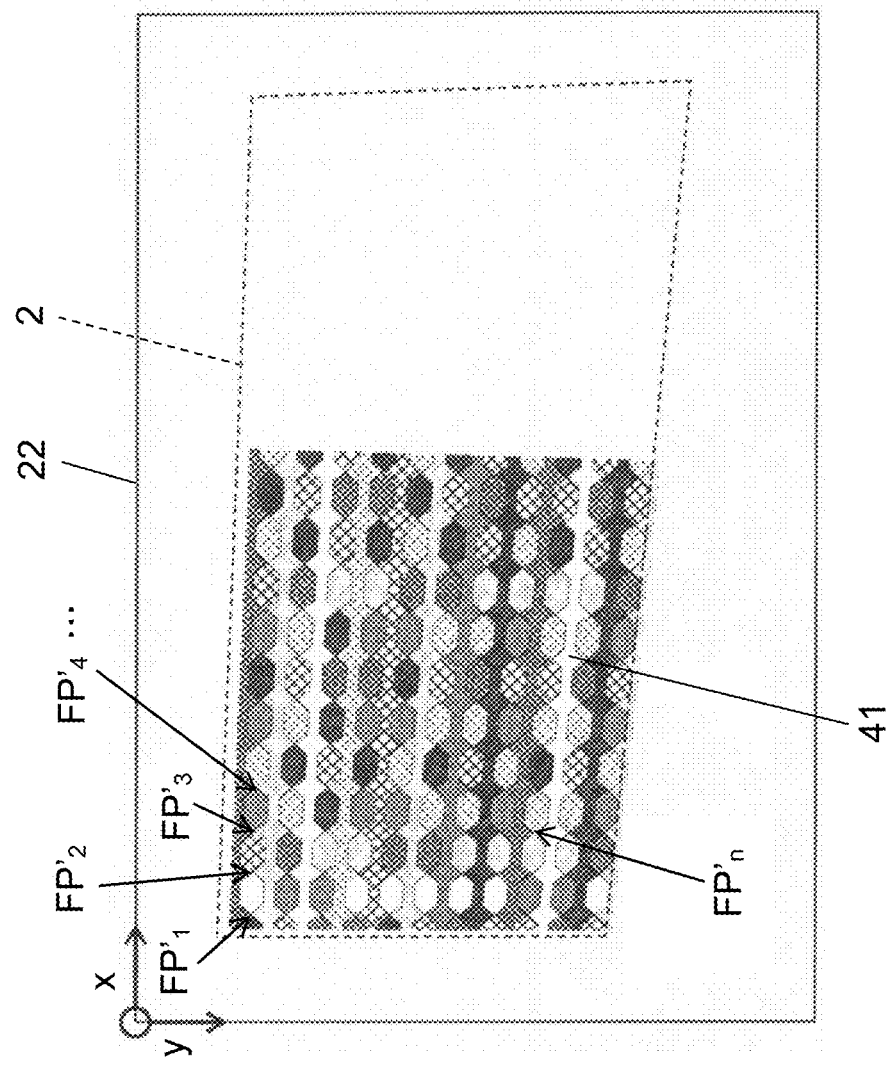
FIG. 12 shows an image containing a test image projected on the screen by the projector, which is imaged by the imaging device when step S21 of FIG. 9 is performed.
Figure 13:
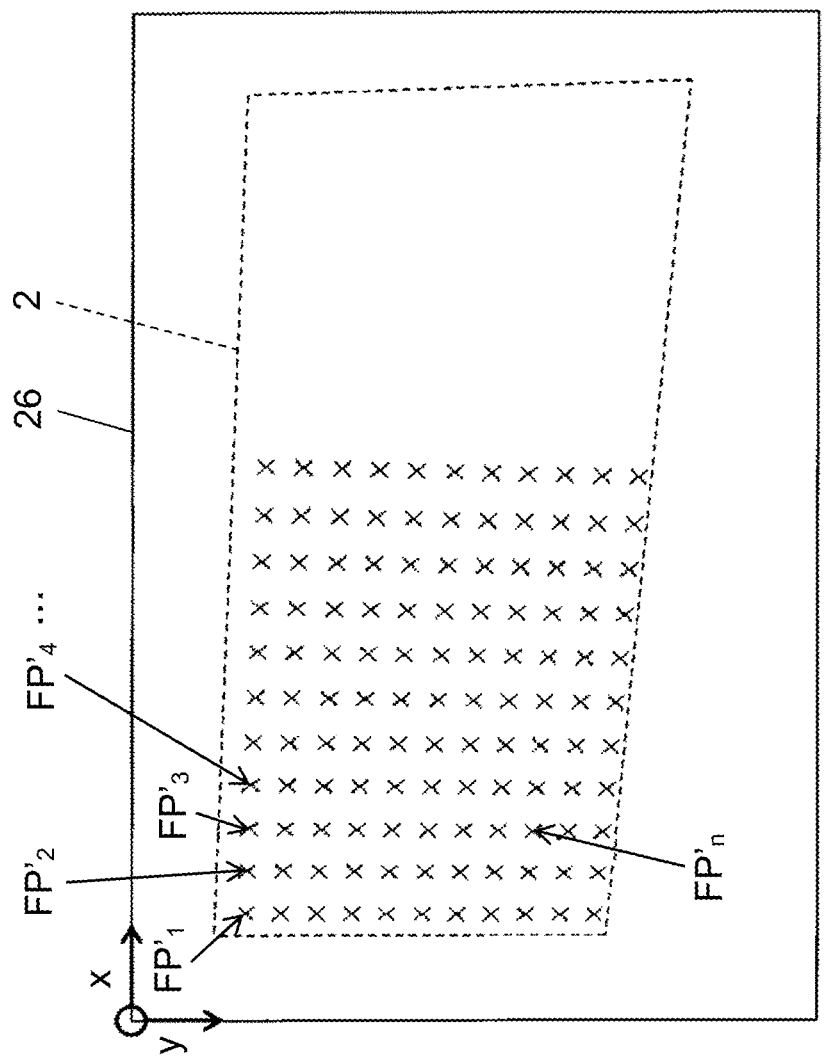
FIG. 13 is a virtual image showing the coordinates of the feature points detected from the test image of FIG. 12.

FIG. 12 shows image 22 containing test image 41 projected on screen 2 by projector 1-1, which is imaged by imaging device 4 when step S21 of FIG. 9 is performed. FIG. 13 is virtual image 26 showing coordinate FP'(N) of the feature points detected from test image 41 of FIG. 12. FIG. 14 shows coordinate FP'(N) of the feature points in test image 41 of FIG. 13, showing the format of data 34 to be stored in memory device 12 of FIG. 1. In step S21 of FIG. 9, projectors 1-1 and 1-2 project the image the same as test image 41 of FIG. 6. Coordinate FP'(N): $FP'_1$, $FP'_2$, $FP'_3$, ..., $FP'_N$ is obtained by the feature-point detecting process of step S21, i.e., obtained by execution of step S16 through step S18 of FIG. 3. FIG. 12 through FIG. 14 show that the relative position or the angle of projector 1-1 and screen 2 has a little bit change after initial calibration, as is shown by a deviation occurred between coordinate FP'(N) of the current positions of the feature points in test image 41 and coordinates FP(N) of the positions of the feature points in test image 41 obtained immediately after initial calibration (see FIG. 6).

Control circuit 11 stores the third position-data and the fourth position-data—separately from the first position-data and the second position-data—into memory device 12.

In step S22 of FIG. 9, control circuit 11 performs a deviation detecting/correcting process based on the first position-data and the second position-data (obtained in step 3 of FIG. 2) and the third position-data and the fourth position-data (obtained in step S21 of FIG. 9). If a deviation of the relative position between screen 2 and projectors 1-1, 1-2 is detected, control circuit 11 recalibrates projectors 1-1, 1-2 to cancel the deviation.

Figure 15:
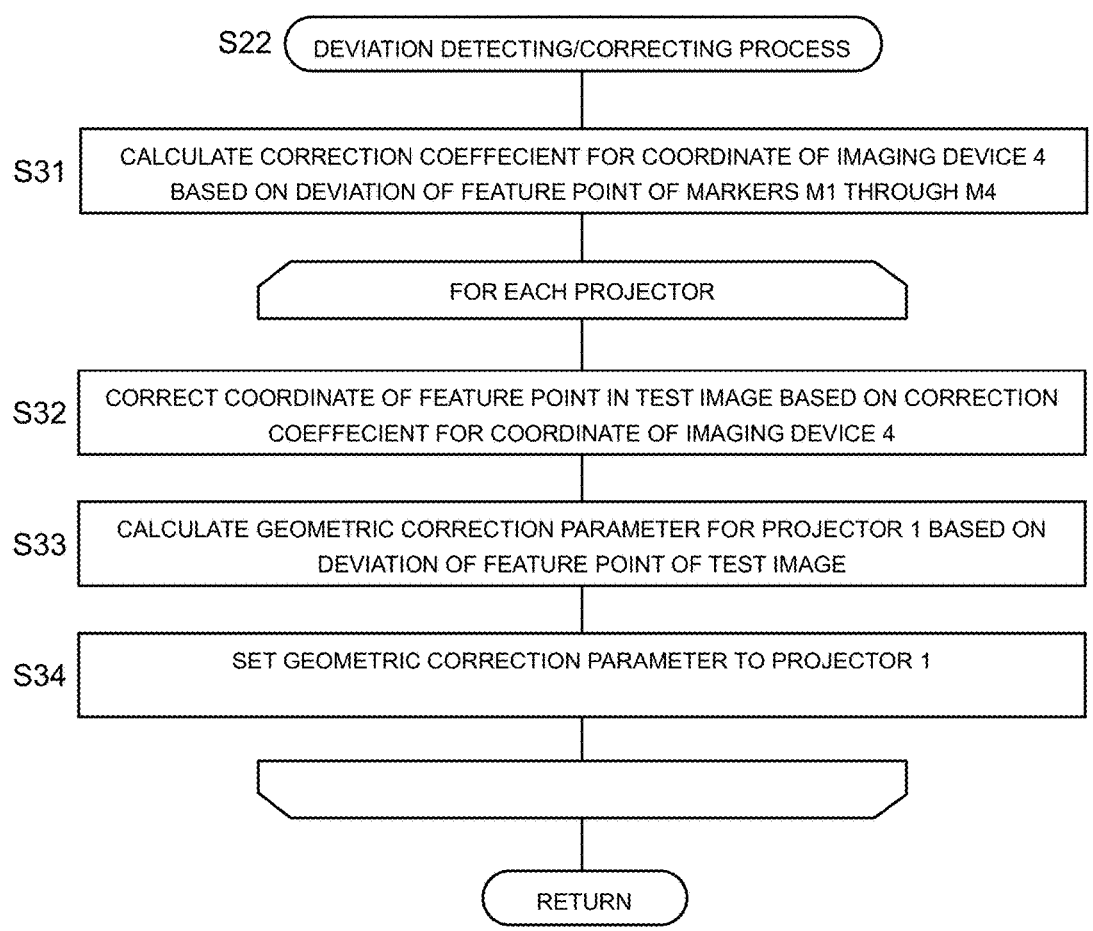
FIG. 15 is a flowchart of the subroutine for the deviation detecting/correcting process at step S22 of FIG. 9.

FIG. 15 is a flowchart of the subroutine for the deviation detecting/correcting process to be performed in step S22 of FIG. 9.

In step S31 of FIG. 15, control circuit 11 obtains a first deviation-data that indicates a deviation of the relative position between imaging device 4 and screen 2, based on a difference between the first position-data and the third position-data (i.e., a feature-point deviation of markers M1 through M4), and based on the first deviation-data, control circuit 11 calculates a correction coefficient for the coordinates of imaging device 4.

The examples of FIG. 10 through FIG. 14 show that a deviation occurs in the relative position or the angle not only between screen 2 and imaging device 4, but also between projector 1-1 and screen 2. Therefore, it is impossible to know how much the deviation occurs between an image projected onto screen 2 by projector 1-1 and the projection range of screen 2 by only comparing coordinate FP(N) of the feature points in test image 41 (FIG. 6)—obtained by the feature-point detecting process of step S3 of FIG. 2—and coordinate FP'(N) of the feature points in test image 41 (FIG. 14) obtained by the feature-point detecting process of step S21. To know the deviation, in step S31 of FIG. 15, control circuit 11 calculates a correction coefficient for correcting the deviation of the relative position or the angle between screen 2 and imaging device 4.

Specifically, based on coordinates $MP_1$ through $MP_4$ of markers M1 through M4 obtained in step S3 of FIG. 2 and coordinates $MP'_1$ through $MP'_4$ of markers M1 through M4 obtained in step S21 of FIG. 9, control circuit 11 calculates homography matrix H. With use of homography matrix H, the coordinate system of imaging device 4 at the current time (i.e., at the time of recalibration) can be converted into the coordinate system of imaging device 4 at the time of initial calibration. Each component of homography matrix H is given by the expression below, where, (x, y) represents the coordinate of the image taken by imaging device 4 at the current time, and (x', y') represents the coordinate of the image taken by imaging device 4 at the initial calibration.

$$H = \begin{pmatrix} H_{11} & H_{12} & H_{13} \\ H_{21} & H_{22} & H_{23} \\ H_{31} & H_{32} & 1 \end{pmatrix} \quad <\text{Expression 1}>$$

At the time, the following relationships hold:

$$x' = \frac{H_{11}x + H_{12}y + H_{13}}{H_{31}x + H_{32}y + 1} \quad <\text{Expression 2}>$$

$$y' = \frac{H_{21}x + H_{22}y + H_{23}}{H_{31}x + H_{32}y + 1} \quad <\text{Expression 3}>$$

How to calculate homography matrix H from at least four well-known corresponding points in two coordinate systems is common knowledge of one skilled in the art, and the description thereof will be omitted.

Next, each of projectors 1-1, 1-2 is recalibrated by performing step S32 through S34 of FIG. 15 for each of them. First, the workings for recalibrating projector 1-1 will be described.

In step S32 of FIG. 15, control circuit 11 corrects coordinate FP'(N) of the feature points in test image 41 obtained by the feature-point detecting process of step 21. The correction is performed, based on the correction coefficient for the coordinates of imaging device 4 calculated in step S31. Through the correction, coordinate FP'(N) of the feature points in test image 41 is corrected to the coordinates obtained from test image 41 taken by imaging device 4 under the relative position and the angle of screen 2 and imaging device 4 at initial calibration instead of the current-time relative position and the angle of screen 2 and imaging device 4. Specifically, corrected coordinate FP"(N) is obtained by converting coordinate FP'(N) with use of the following expression and homography matrix H calculated in step S31.

$$FP''(N) = H \times FP'(N) \qquad \text{<Expression 4>}$$

Control circuit 11 obtains corrected coordinate FP"(N) as a fifth position-data.

Figure 16:
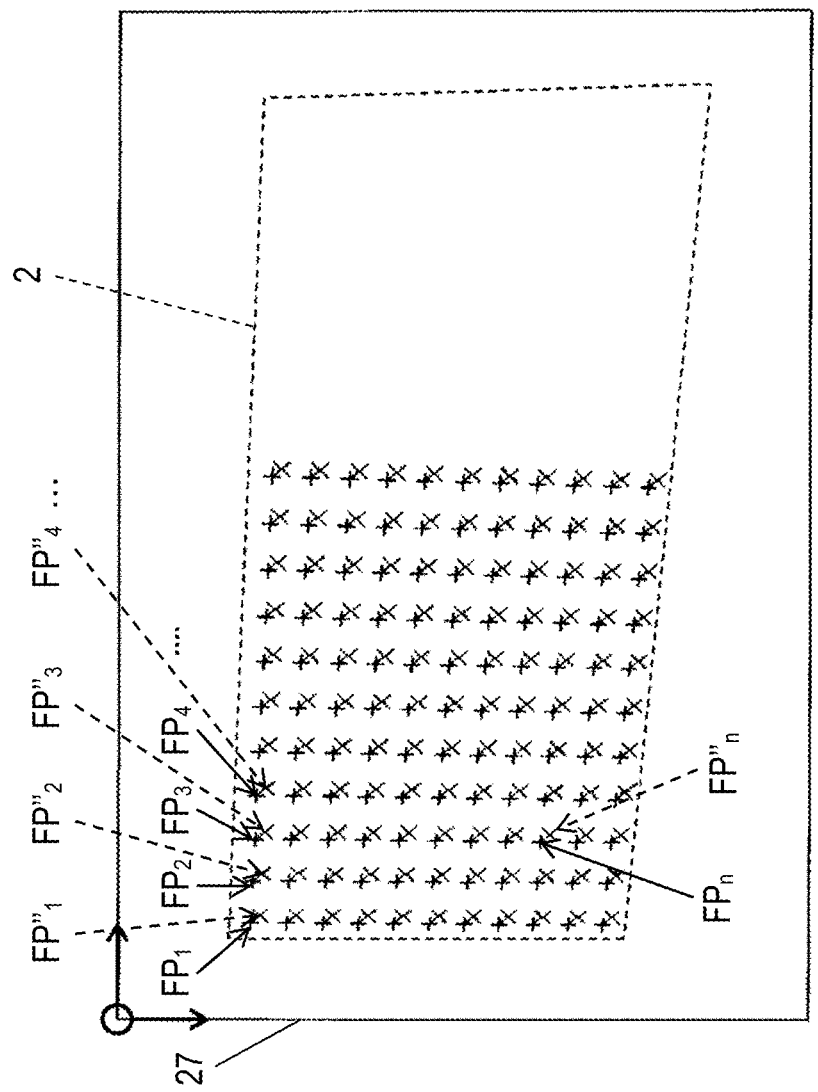
FIG. 16 is virtual image, which shows the coordinates of the feature points detected from the test image of FIG. 6 and the coordinates of the feature points of the test image corrected in step S32 of FIG. 15.

FIG. 16 is virtual image 27, which shows coordinate FP(N) of the feature points detected from test image 41 of FIG. 6 and coordinate FP"(N) of test image 41 having corrected coordinates in step S32 of FIG. 15. Coordinate FP(N) of FIG. 16 shows a set of positions of the feature points detected from test image 41 that is projected by projector 1-1 onto screen 2 when the initial calibration process is performed. Coordinate FP"(N) of FIG. 16 is obtained through the correction in which Expression 4 is applied to coordinate FP'(N) of the feature points in test image 41 obtained by the feature-point detecting process of step S21 and then imaging device 4 images test image 41 under the condition of the relative position and the angle of screen 2 and imaging device 4 at initial calibration. Coordinate FP"(N) is a corrected coordinate by removing an amount of change—caused by a deviation of the relative position and the angle between screen 2 and imaging device 4—from coordinate FP'(N) of the feature points in test image 41 obtained by the feature-point detecting process of step S21. Therefore, the deviation between coordinate FP(N) and coordinate FP"(N) only shows a deviation of the relative position or the angle between projector 1-1 and screen 2.

In step S33 of FIG. 15, based on the difference between the second position-data and the fifth position-data (i.e., the deviation between coordinate FP(N) and coordinate FP"(N) of the feature points in test image 41), control circuit 11 obtains a second deviation-data. The second deviation-data indicates a deviation of the relative position between screen 2 and projectors 1-1, 1-2. Based on the deviation data, control circuit 11 calculates geometric correction parameter for projector 1. To be specific, control circuit 11 calculates geometric correction parameter with which coordinate FP"$_n$ moves to coordinate FP$_n$ for each feature point n. To be more specific, control circuit 11 calculates homography matrix H as the geometric correction parameter with which coordinate FP"$_n$ moves to coordinate FP$_n$ for the following four feature points: feature point n; feature point n+1 disposed on the immediate right; feature point n+m disposed just below (where, 'm' indicates the number of feature points in a single horizontal row); and feature point n+m+1 disposed diagonally lower right.

In step S34 of FIG. 15, control circuit 11 sets the geometric correction parameter calculated in step S33 to projector 1. Through the parameter setting, control circuit 11 recalibrates projector 1-1 so as to project an image fitted within the projection range of screen 2. Specifically, memory device 12 retains homography matrix Hold$_n$ as the current-time geometric correction parameter in a region for storing geometric correction parameter for feature point n. When homography matrix Hn is set to projector 1-1, new homography matrix is calculated by the expression: Hnew$_n$=Hold$_n \times$H$_n$. As a result, the geometric correction parameter stored in memory device 12 is updated to homography matrix Hnew$_n$.

Figure 17:
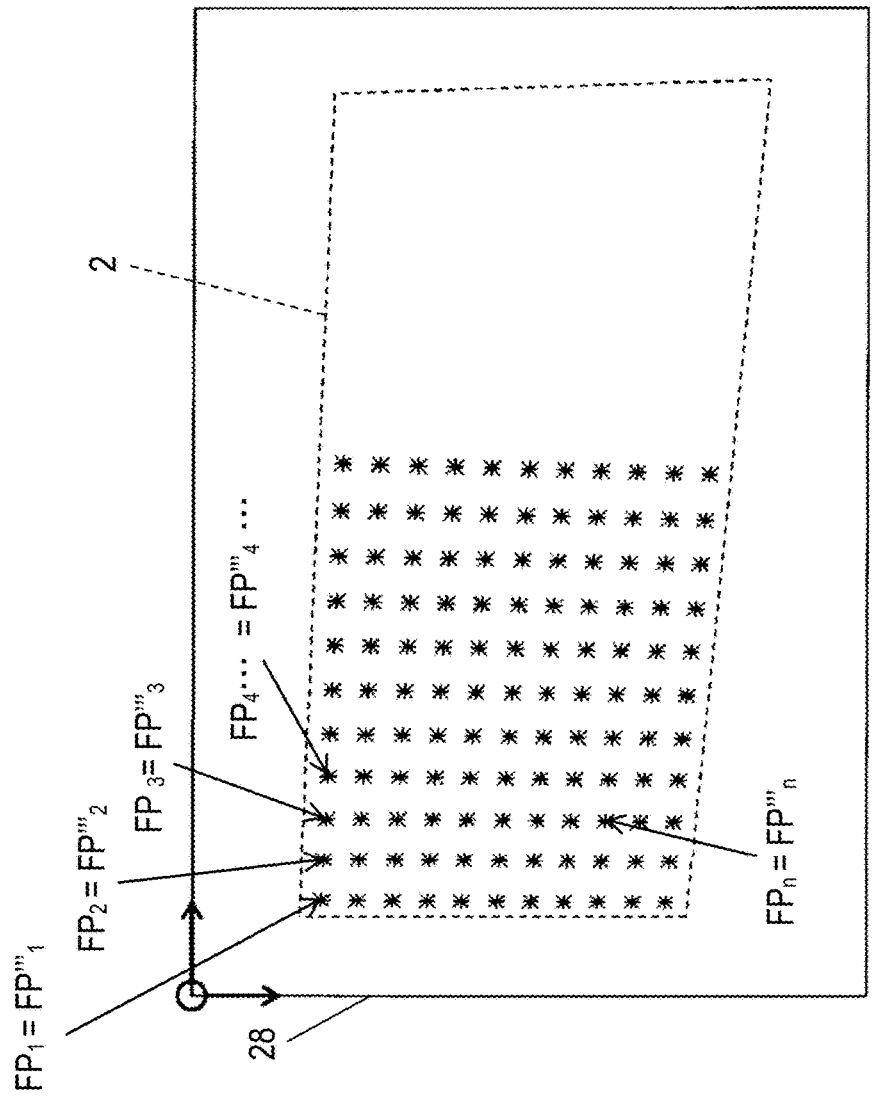
FIG. 17 is a virtual image, which shows the coordinates of the feature points detected from the test image of FIG. 6 and the coordinates of the feature points obtained by virtually projected on the screen by the projector and then virtually imaged by the imaging device after execution of step S34 of FIG. 15.

FIG. 17 is virtual image 28, which shows coordinates FP(N) of the feature points detected from test image 41 of FIG. 6 and coordinates FP'"(N) of the feature points in test image 41 obtained by virtually projected on screen 2 by projector 1-1 and then virtually imaged by imaging device 4 after execution of step S34 of FIG. 15. FIG. 17 shows coordinate FP'"(N), with the result that geometric correction parameter H$_n$ has been set to projector 1-1. As the result of updating the geometric correction parameter of projector 1-1, projector 1-1 undergoes recalibration so as to project an image fitted with the projection range of screen 2. Coordinate FP'"(N) of the feature points in test image 41, which is obtained by the calculation based on the correction coefficient calculated in step S31 of FIG. 15 and the geometric correction parameter calculated in step S33, agrees with coordinate FP(N) of the feature points of test image 41 obtained immediately after initial calibration.

In step S33 described above, if coordinate FP"(N) agrees with coordinate FP(N), control circuit 11 may skip step S34 on the determination that no deviation has occurred in the relative position and the angle between projector 1-1 and screen 2 since the initial calibration was performed.

Next, as for projector 1-2, too, performing steps S32 through S34 of FIG. 15 allows projector 1-2 to be recalibrated, as is the case with projector 1-1. When the projection display system has three or more projectors, steps S32 through S34 of FIG. 15 are performed repeatedly for each projector.

On the completion of the deviation detecting/correcting process for the projectors in step S22, control circuit 11 determines at step S23 of FIG. 9 whether a deviation has been corrected or not in step S22; in the case of 'Yes', the procedure goes to step S24; otherwise, it goes to the end.

In step S24, control circuit 11 performs the feature-point detecting process for measuring the current state of projection display system 100—the state immediately after recalibration of projectors 1-1, 1-2 in step S22 (the feature-point detecting process immediately after recalibration). The feature-point detecting process in step S24 is the same as that in step S3 of FIG. 2 described with reference to FIG. 3. After recalibration of projectors 1-1 and 1-2, step S11 through S15 of FIG. 3 are performed. Through the steps, control circuit 11 causes imaging device 4 to capture an image of screen 2, and obtains a first position-data. The first position-data indicates the relative position of and angle between screen 2 and imaging device 4 immediately after recalibration of projectors 1-1, 1-2. Further, performing steps S16 through S19 of FIG. 3 allows projectors 1-1, 1-2 to project test image 41 onto screen 2, and allows imaging device 4 to image test image 41. Through the steps above, control circuit 11 obtains again a second position-data showing the positions of the feature points in test image 41. The second position-data indicates the relative position and the angle between screen 2 and each of projectors 1-1, 1-2 immediately after recalibration of projectors 1-1, 1-2. Further, control circuit 11 stores the first position-data and the second position-data in memory device 12.

Control circuit 11 updates the position data by replacing the previously stored first position-data and the second position-data in memory device 12 with the first position-data and the second position-data newly obtained in step S24.

The recalibration process of FIG. 9 may be performed with an appropriate timing in the operation of projection display system 100. For example, the recalibration process may be performed at a restart timing of projection display system 100, or may be regularly performed every week or every month. Further, the process may be manually performed by the user as necessary; in that case, when the user finds necessity of recalibration in the image projected onto screen 2, the recalibration process is performed in response to a predetermined command entered by the user into calibration device 10 via input device 13.

[1-3. Effect]

Calibration device 10 for the projection display device (projectors 1-1, 1-2) of an aspect of the present disclosure is calibration device 10 for calibrating at least one projector (of projectors 1-1 and 1-2) that project an image onto screen 2 (as a projection plane). Calibration device 10 has memory device 12 and control circuit 11 (as a controller). After calibrating projectors 1-1 and 1-2, control circuit 11 causes imaging device 4 to capture an image of screen 2, control circuit 11 obtaining from the captured image a first position-data indicating the set of positions of plural feature points in screen 2. Further, control circuit 11 causes projectors 1-1, 1-2 to project test image 41 onto screen 2, and causes imaging device 4 to capture an image of test image 41, control circuit 11 obtaining from the captured image a second position-data indicating the set of positions of plural feature points in test image 41. Control circuit 11 stores the first position-data and the second position-data into memory device 12. After obtaining of the first position-data and the second position-data, control circuit 11 causes imaging device 4 to capture an image of screen 2, by which control circuit 11 obtains a third position-data indicating the set of positions of plural feature points in screen 2. Further, control circuit 11 causes projectors 1-1, 1-2 to project test image 41 onto screen 2, and then causes imaging device 4 to capture an image of test image 41, control circuit 11 obtaining from the captured image a fourth position-data indicating the set of positions of plural feature points in test image 41. Control circuit 11 stores the third position-data and the fourth position-data into memory device 12. Next, based on the difference between the first position-data and the third position-data, control circuit 11 obtains a first deviation-data indicating a deviation in the relative position between imaging device 4 and screen 2. Based on the first deviation-data, control circuit 11 corrects the set of positions of the feature points in test image 41 contained in the fourth position-data to create a fifth position-data. Further, based on the difference between the second position-data and the fifth position-data, control circuit 11 obtains a second deviation-data indicating a deviation in the relative position between projectors 1-1, 1-2 and screen 2. Based on the second deviation-data, control circuit 11 recalibrates projectors 1-1, 1-2.

According to calibration device 10 for the projection display device of an aspect of the present disclosure, after recalibration of projectors 1-1, 1-2, control circuit 11 may obtain again the first position-data and the second position-data, and then may store them into memory device 12.

According to calibration device 10 for the projection display device of an aspect of the present disclosure, a plurality of markers M1 through M4 that emits light under control of control circuit 11 may be disposed at a plurality of predetermined positions in screen 2. In the structure above, control circuit 11 causes imaging device 4 to capture an image of screen 2 and markers M1 through M4, and obtains the positions of markers M1 through M4 as the positions of the feature points of screen 2. Control circuit 11 thus obtains a first position-data and a third position-data.

According to calibration device 10 for the projection display device of an aspect of the present disclosure, calibration device 10 may further have communication circuit 14 (as a communicator). In the structure, imaging device 4 is connected to calibration device 10 via communication circuit 14.

According to calibration device 10 for the projection display device of an aspect of the present disclosure, calibration device 10 may further have communication circuit 14. In the structure, projectors 1-1, 1-2 are connected to calibration device 10 via communication circuit 14.

Projection display system 100 of an aspect of the present disclosure has an object with screen 2 on which an image is projected, at least one projector (having projector 1-1 and projector 1-2), imaging device 4, and calibration device 10.

According to the calibration method for the projection display device of an aspect of the present disclosure, calibration device 10 having memory device 12 and control circuit 11 calibrates at least one projector formed of projector 1-1 and projector 1-2 that projects an image onto screen 2. The calibration method includes the step in which, after calibration of projectors 1-1 and 1-2, control circuit 11 causes imaging device 4 to capture an image of screen 2, control circuit 11 obtaining from the captured image a first position-data that indicating the set of positions of plural feature points in screen 2;

control circuit 11 causes control of projectors 1-1, 1-2 to project test image 41 onto screen 2 and then causes imaging device 4 to capture an image of test image 41, control circuit 11 obtaining from the captured image a second position-data that indicating the set of positions of plural feature points in test image 41; and control circuit 11 stores the first position-data and the second position-data into memory device 12.

The calibration method includes the step in which, after acquisition of the first position-data and the second position-data, control circuit 11 causes imaging device 4 to capture an image of screen 2, control circuit 11 obtaining a third position-data that indicating the set of positions of the feature points in screen 2;

control circuit 11 causes projectors 1-1, 1-2 to project test image 41 onto screen 2 and then causes imaging device 4 to capture an image of test image 41, control circuit 11 obtaining from the captured image a fourth position-data that indicating the set of positions of the feature points in test image 41; and control circuit 11 stores the third position-data and the fourth position-data into memory device 12.

The calibration method includes the step in which, based on the difference between the first position-data and the third position-data, control circuit 11 obtains a first deviation-data that indicates a deviation in the relative position between imaging device 4 and screen 2; and based on the first deviation-data, control circuit 11 corrects the set of positions of the feature points in test image 41 contained in the fourth position-data, to create a fifth position-data.

The calibration method includes the step in which, based on the difference between the second position-data and the fifth position-data, control circuit 11 obtains a second deviation-data that indicates a deviation in the relative position between projectors 1-1, 1-2 and screen 2; and based on the second deviation-data, control circuit 11 recalibrates projectors 1-1, 1-2.

The program of the projection display device of an aspect of the present disclosure has the step for calibrating at least one projector formed of projectors 1-1 and 1-2 that projects an image onto screen 2, and the step is executed by a computer. The program includes the following steps, which are performed by control circuit 11 of calibration device 10 having memory device 12 and control circuit 11. The program includes the step in which, after calibration of projectors 1-1 and 1-2, control circuit 11 causes imaging device 4 to capture an image of screen 2, control circuit 11 obtaining from the captured image a first position-data that indicating the set of positions of plural feature points in screen 2;

control circuit 11 causes projectors 1-1, 1-2 to project test image 41 onto screen 2 and then causes imaging device 4 to capture an image of test image 41, control circuit 11 obtaining from the captured image a second position-data that indicating the set of positions of plural feature points in test image 41; and control circuit 11 stores the first position-data and the second position-data into memory device 12.

The program includes the step in which, after acquisition of the first position-data and the second position-data, control circuit 11 causes imaging device 4 to capture an image of screen 2, control circuit 11 obtaining from the captured image a third position-data that indicating the set of positions of the feature points in screen 2;

control circuit 11 causes projectors 1-1, 1-2 to project test image 41 onto screen 2 and then causes imaging device 4 to capture an image of test image 41, control circuit 11 obtaining from the captured image a fourth position-data that indicating the set of positions of the feature points in test image 41; and control circuit 11 stores the third position-data and the fourth position-data into memory device 12.

The program includes the step in which, based on the difference between the first position-data and the third position-data, control circuit 11 obtains a first deviation-data that indicates a deviation in the relative position between imaging device 4 and screen 2; and based on the first deviation-data, control circuit 11 corrects the set of positions of the feature points in test image 41 contained in the fourth position-data, to create a fifth position-data.

The program includes the step in which, based on the difference between the second position-data and the fifth position-data, control circuit 11 obtains a second deviation-data that indicates a deviation in the relative position between projectors 1-1, 1-2 and screen 2; and based on the second deviation-data, control circuit 11 recalibrates projectors 1-1, 1-2.

With the structure and the workings described above, projection display system 100 of the first exemplary embodiment detects a deviation of the relative position between projectors 1-1, 1-2 and screen 2 occurred after calibration of projectors 1-1, 1-2, and recalibrates them, while taking a deviation of imaging device 4 itself into consideration. Projection display system 100 of the first exemplary embodiment, even if a deviation in the relative position and the angle between screen 2 and imaging device 4 occurs after initial calibration or recalibration, further performs recalibration, so that projectors 1-1, 1-2 are automatically and properly recalibrated as with the state of initial calibration.

Second Exemplary Embodiment

Hereinafter, the structure of the second exemplary embodiment is described with reference to FIG. 18.

Figure 18:
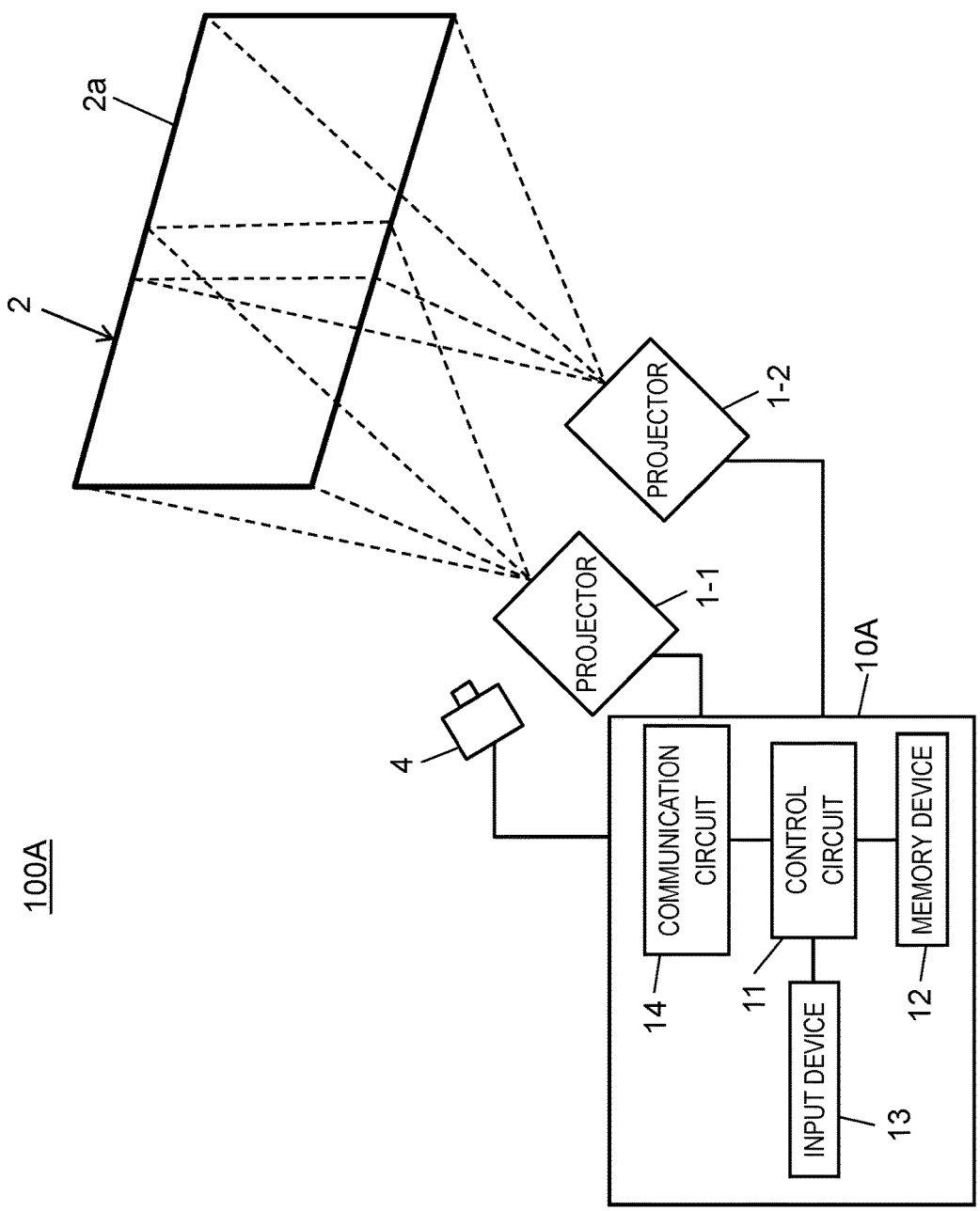
FIG. 18 is a schematic view showing the projection display system in accordance with a second exemplary embodiment.

FIG. 18 is a schematic view showing projection display system 100A in accordance with the second exemplary embodiment. Projection display system 100A of FIG. 18 differs from projection display system 100 of FIG. 1 in having no markers M1 through M4 and marker control device 3. Besides, instead of calibration device 10 of FIG. 1, projection display system 100A has calibration device 10A having no control on markers M1 through M4 and marker control device 3. As for the rest of the structure, projection display system 100A is constructed in a similar way to projection display system 100 and works in the same way.

According to an aspect of the present disclosure, the projection plane may be formed in framed screen 2. In that case, control circuit 11 causes imaging device 4 to capture an image of screen 2 and frame 2a and control circuit 11 obtains a plurality of positions such as corners of frame 2a of screen 2 as the plurality of positions of a feature point in screen 2. That is, the first position-data and the third position-data are thus obtained. Having no markers M1 through M4 and marker control device 3 allows projection display system 100A to have a structure lower in cost than that of the first exemplary embodiment.

As an alternative to the markers above, the projection display system may have infrared reflecting markers at two or more predetermined positions in screen 2. In that case, control circuit 11 causes imaging device 4 to capture an image of screen 2 and the infrared reflecting markers. Control circuit 11 obtains the positions of the infrared reflecting markers as the positions of the feature points in screen 2, that is, the first position-data and the second position-data are thus obtained.

As further alternative to the above, the projection display system may have a laser light source that emits light under control of control circuit 11. In that case, control circuit 11 causes the laser light source and imaging device 4 so that imaging device 4 images screen 2 under laser light projected onto a plurality of predetermined positions in screen 2. Control circuit 11 obtains the positions at which laser light is projected as the positions of the feature points in screen 2, that is, the first position-data and the third position-data are thus obtained.

Third Exemplary Embodiment

Hereinafter, the structure of the third exemplary embodiment is described with reference to FIG. 19.

Figure 19:
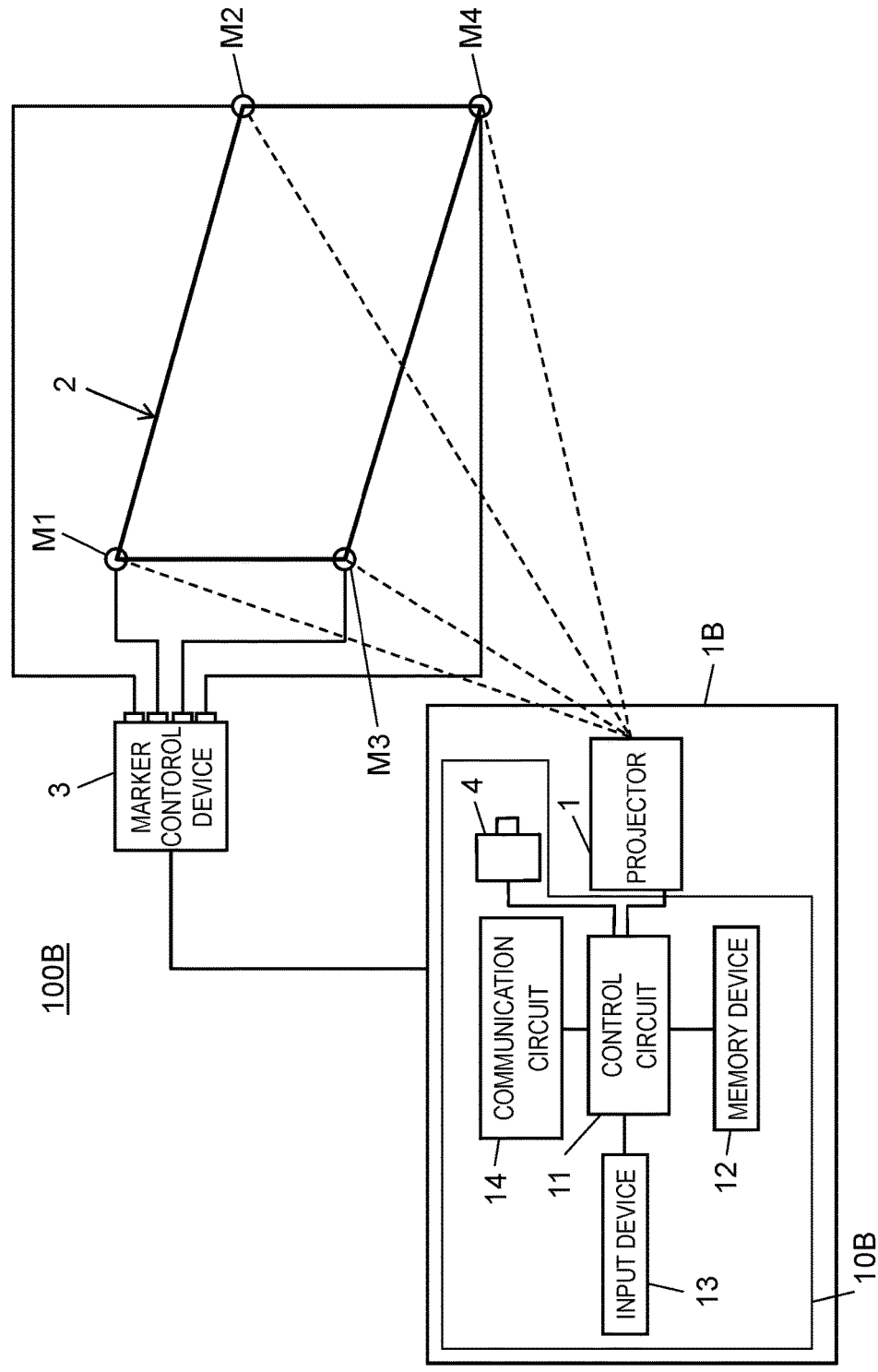
FIG. 19 is a schematic view showing the projection display system in accordance with a third exemplary embodiment.

FIG. 19 is a schematic view showing projection display system 100B in accordance with the third exemplary embodiment.

Projection display system 100B of FIG. 19 has—instead of projectors 1-1, 1-2, imaging device 4, and calibration device 10 of projection display system 100 of FIG. 1—projector device 1B as an integrated structure of the components above.

Projector device 1B has single projector 1, imaging device 4, control circuit 11, memory device 12, input device 13, and communication circuit 14. Projector 1 is constructed in a similar way to one of projectors 1-1, 1-2 of FIG. 1 and works in the same way. Imaging device 4, control circuit 11, memory device 12, input device 13, and communication circuit 14 are constructed in a similar way to the corresponding components of FIG. 1, and work in the same way.

According to an aspect of the present disclosure, calibration device 10B may be built in calibration device 10B.

According to an aspect of the present disclosure, imaging device 4 may be built in projector device 1B.

The structure of the present disclosure is versatile as technique to correct a deviation in adjustment of an image projected by a projection display device.

What is claimed is:

1. A calibration device comprising:
a controller for calibrating at least one projection display device that projects an image on a projection plane, wherein,
the controller causes an imaging device to capture an image of the projection plane, the controller obtaining from the captured image a first position-data that indicating a set of positions of plural feature points in the projection plane, the controller causes the at least one projection display device to project a test image on the projection plane and then causes the imaging device to capture an image of the test image, the controller obtaining from the captured image a second position-data that indicating a set of positions of plural feature points in the test image, and then,
the controller causes the imaging device to capture an image of the projection plane, the controller obtaining from the captured image a third position-data that indicating a set of positions of the feature points in the projection plane, the controller causes the at least one projection display device to project the test image on the projection plane and then causes the imaging device to capture an image of the test image, the controller obtaining from the captured image a fourth position-data that indicating a set of positions of the feature points in the test image,
based on a difference between the first position-data and the third position-data, the controller obtains a first deviation-data that indicates a deviation in a relative position between the imaging device and the projection plane, and based on the first deviation-data, the controller corrects the set of positions of the feature points in the test image contained in the fourth position-data to create a fifth position-data, and
based on a difference between the second position-data and the fifth position-data, the controller obtains a second deviation-data that indicates a deviation in a relative position between the at least one projection display device and the projection plane, and based on the second deviation-data, the controller calibrates the at least one projection display device.

2. The calibration device according to claim 1, wherein the controller obtains again the first position-data and the second position-data after recalibration of the at least one projection display device.

3. The calibration device according to claim 1, wherein,
a plurality of markers that emits light under control of the controller is disposed at predetermined four-or-more positions in the projection plane,
the controller causes the imaging device to image the projection plane and the plurality of markers, and obtains the predetermined four-or more positions of the plurality of markers as the set of positions of the feature points in the projection plane, the controller obtaining the first position-data and the third position-data.

4. The calibration device according to claim 1,
wherein,
the projection plane is formed as a screen with a frame,
the controller causes the imaging device to capture an image of the screen, and obtains a plurality of positions of the frame as the plurality of positions of the feature point, the controller obtaining the first position-data and the third position-data.

5. The calibration device according to claim 1 further including a communicator,
wherein the imaging device is connected to the calibration device via the communicator.

6. The calibration device according to claim 1 further including the imaging device.

7. The calibration device according to claim 1 further including a communicator,
wherein the projection display device is connected to the calibration device via the communicator.

8. A projection display device including the calibration device according to claim 1.

9. A projection display system comprising:
a projection object having a projection plane;
at least one projection display device;
an imaging device; and
the calibration device according to claim 1.

10. A method for calibrating at least one projection display device that projects an image onto a projection plane, comprising the steps of:
capturing an image of the projection plane by an imaging device obtaining from the captured image a first position-data that indicating a set of positions of plural feature points in the projection plane, and projecting a test image onto the projection plane by the at least one projection display device and capturing an image of the test image by the imaging device obtaining from the captured image a second position-data that indicating a set of positions of plural feature points in the test image;
capturing an image of the projection plane by the imaging device after the obtaining of the first position-data and the second position-data, obtaining a third position-data that indicating a set of positions of the feature points in the projection plane, and projecting the test image onto the projection plane by the at least one projection display device and capturing an image of the test image by the imaging device obtaining from the captured image a fourth position-data that indicating a set of positions of the feature points in the test image;
obtaining a first deviation-data that indicates a deviation in a relative position between the imaging device and the projection plane on the basis of a difference between the first position-data and the third position-data, and correcting the set of positions of the feature points in the test image contained in the fourth position-data on basis of the first deviation-data to create a fifth position-data; and
obtaining a second deviation-data that indicates a deviation in a relative position between the at least one projection display device and the projection plane on the basis of a difference between the second position-data and the fifth position-data, and calibrating the at least one projection display device on basis of the second deviation-data.

11. A non-transitory computer readable medium having stored thereon a program to be executed by a computer for calibration of at least one projection display device that projects an image onto a projection plane, comprising the steps of:
capturing an image of the projection plane by an imaging device obtaining from the captured image a first position-data that indicating a set of positions of plural feature points in the projection plane, and projecting a test image onto the projection plane by the at least one projection display device and capturing an image of the test image by the imaging device obtaining from the captured image a second position-data that indicating a set of positions of plural feature points in the test image;

capturing an image of the projection plane by the imaging device after the obtaining of the first position-data and the second position-data, obtaining a third position-data that indicating a set of positions of the feature points in the projection plane, and projecting the test image onto the projection plane by at least one the projection display device and capturing an image of the test image by the imaging device obtaining from the captured image a fourth position-data that indicating a set of positions of the feature points in the test image;

obtaining a first deviation-data that indicates a deviation in a relative position between the imaging device and the projection plane on the basis of a difference between the first position-data and the third position-data, and correcting the set of positions of the feature points in the test image contained in the fourth position-data on basis of the first deviation-data to create a fifth position-data; and obtaining a second deviation-data that indicates a deviation in a relative position between the at least one projection display device and the projection plane on the basis of a difference between the second position-data and the fifth position-data, and calibrating the at least one projection display device on basis of the second deviation-data.

* * * * *